July 3, 1945.  D. B. PERRY  2,379,825

SILENT TYPE CHAIN

Filed April 30, 1943

Inventor:
David B. Perry
By: Edward C. Fitzhaugh
Atty.

Patented July 3, 1945

2,379,825

UNITED STATES PATENT OFFICE 2,379,825

SILENT TYPE CHAIN

David B. Perry, Ithaca, N. Y., assignor to Morse Chain Company, Ithaca, N. Y., a corporation of New York Application April 30, 1943, Serial No. 485,147

7 Claims. (Cl. 74—251)

This invention relates to drive chains of the silent type, and has as its object to provide an improved construction in this type of chain for limiting the pivotal movement of adjacent links in one direction so as to restrict whipping.

More specifically, it is my object to provide a silent type chain having an anti-whip construction which does not materially contribute to the wearing of the joints of the chain.

Another object of the invention is to provide a drive chain incorporating an anti-whip construction, in which the chain is of extremely simple and inexpensive construction.

These and other objects and features of the invention will become apparent from the following specification when taken together with the accompanying drawing in which.

Figure 1:
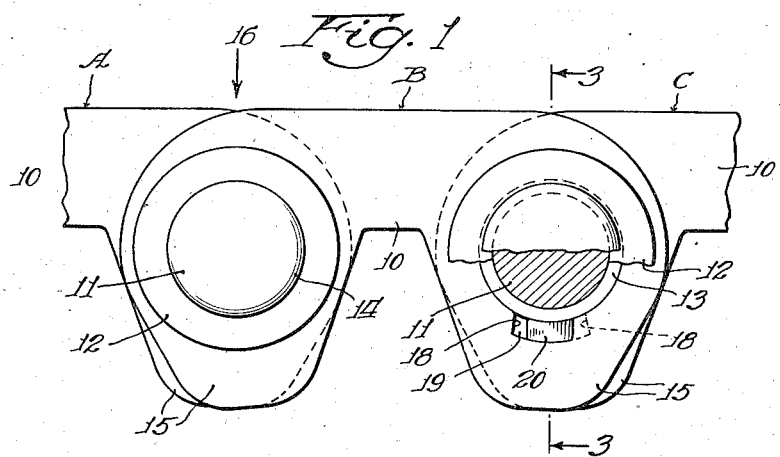
Fig. 1 is a side elevation of a portion of a drive chain embodying the invention, taken as indicated by the lines 1—1 of Fig. 3, parts being broken away and shown in section to better illustrate the construction.

As an example of one form in which my invention may be embodied, I have shown in the drawing a portion of a drive chain of the silent type, such as the timer drive chain of a motor vehicle. Such a chain comprises a plurality of groups of links 10 connected by pintles 11. The present invention contemplates that the apertures in all of the links shall be of identical construction, but for convenience in describing the operation of the chain, the several successive groups of links herein illustrated are designated by the reference letters A, B and C. The ends of the links A and C are interleaved alternately between the respective ends of the links B, the links A and C being in one series of planes and the links B being in alternate series of planes. The links are maintained in assembly in the completed chain by means of washers 12 which are seated in annular grooves 13 in the ends of the pintles 11, the grooves 13 being formed by peening the ends of the pintles 11 as at 14.

The chain has drive teeth 15 formed on each end of each link 10 and adapted to coact with the teeth of a sprocket.

The invention deals with the problem of restraining whipping of the chain by limiting its bending movement in an inward direction (indicated by the arrow 16 in Fig. 1), so that the chain is not permitted to bend inwardly beyond the in-line position of the links shown in Fig. 1. The chain is permitted to bow in the opposite direction so as to conform to a sprocket, the limit of such outward bowing being indicated by the relative positions of the links in Fig. 2.

Many expedients have been adopted in the past to secure this general result, both in the silent type chain and in roller chain. However, all such expedients have, insofar as I am aware, involved the use of segmental bushings or of pintles other than cylindrical in shape. While many of these prior anti-whip chains have been quite satisfactory in operation when new, all of them have been subject to the objection that the anti-whip feature increases the rapidity of wear between the pintles and links or between the bushings and links. For example, in a prior construction embodying joint sections (pintles or bushings) of two or more parts, the joint sections are unseated slightly upon contact with their coacting abutments in the link apertures, and this unseating, followed by reseating in a continuous cycle during the operation of the chain, promotes rapid wear.

The present invention avoids the mutilation of the pintles and utilizes completely cylindrical pintles of suitable material which are centerless-ground so as to provide only sufficient clearance between the pintles and the pintle apertures 17 in the links 10 to permit adequate lubrication. The pintles, thus constructed, are much more accurate in external surface contour than is possible where the pintles are constructed of cold drawn or formed sections non-cylindrical in shape.

The pintle apertures 17 are likewise formed very accurately, each being of truly circular shape throughout a major part of its circumference. While the aperture 17 is of non-circular cross-section in its entirety, and is initially formed by a non-circular punch, the main circular portion thereof is finished to a high degree of accuracy by a plain ground cylindrical shaving punch. Thus the surfaces which carry the load of the forces transmitted through the chain are accurately finished to cylindrical contour and, being of almost 360° circumferential extent, provide a maximum bearing surface and a maximum resistance to wear.

The anti-whip feature is introduced by forming the apertures 17 with arcuate notches 18, the outer surfaces 19 of which are concentric with the apertures 17. The notches 18 are formed by a key-shaped punch, simultaneously with the rough punching of the apertures 17 and prior to the shaving of the apertures 17 in the finishing operation.

Figure 2:
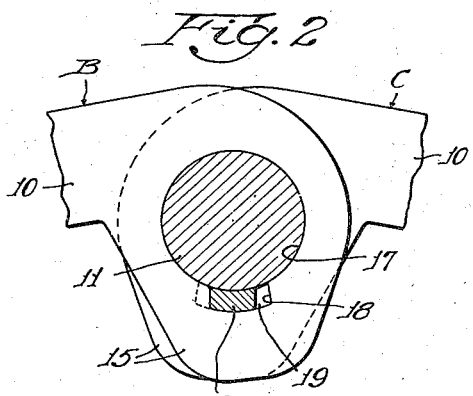
Fig. 2 is a sectional view taken longitudinally through a pair of adjacent links of the chain, taken as indicated by the lines 2—2 of Fig. 3, the chain being shown in the outwardly bowed condition.
Figure 3:
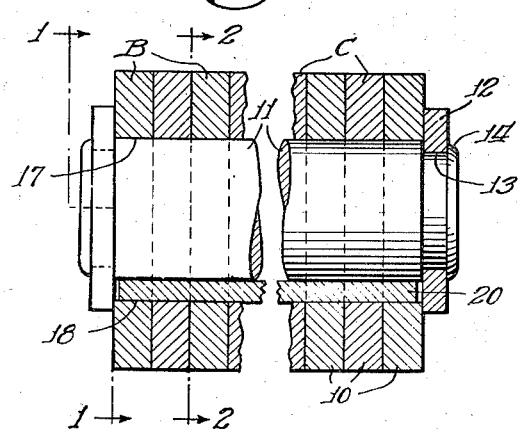
Fig. 3 is a transverse sectional view through the chain, taken as indicated by the line 3—3 of Fig. 1.

Between the notches 18 and the pintles 11 are formed a series of arcuate spaces extending throughout the width of the chain and closed at their ends by the washers 12. In these spaces are received keys 20 each having convex faces one of which is fitted to the arcuate notch surfaces 19 and the other of which bears against the cylindrical surface of a pintle 11. The keys 20 have considerable clearance in the notches 18 in a circumferential direction. This circumferential clearance permits limited movement of the links about the pintles 11 between the extreme positions shown in Figs. 1 and 2 respectively. Inward bowing of the chain beyond the in-line position shown in Fig. 1 is restricted by contact of the right extremities of the notches 18 of the B group of links with the right side of the key 20 and contact of the left extremities of the C group of links 10 with the left side of the key 20. Outward bowing of the chain beyond the position shown in Fig. 2 is limited by contact of the left extremities of the series B group of links with the left side of the key 20 and contact of the right extremities of the C group of links with the right side of the key 20.

Since the keys 20 are not attached to the pintles 11, and bearing contact between the apertures 17 and pintles 11 extends throughout almost a complete circumference, it is impossible for the pintles 11 to be unseated by any component of pressure exerted against the keys 20 by the limiting contact thereof with the extremities of the aperture extensions 18. Furthermore, owing to the small circumferential width of the keys 20, the forces exerted against them by the respective series of links are in substantially aligned opposition to each other, are substantially entirely absorbed within the structures of the keys themselves, and have no appreciable radial components such as to exert pressure against the pintles 11. Being separate from the pintles 11, the keys 20 transmit no oscillating movement to the pintles, and accordingly the oscillating movement of the pintles in their bearing apertures is restricted solely to that required to permit the hinging movement of the links.

By varying the width of the keys, the degree of flexing permitted in the chain may be controlled.

The keys 20 are made of a hard material such as clock spring steel.

For convenience in assembling a chain of this type, it is necessary to have suitable clearance in the apertures to admit of the pintles freely entering the apertures. The present invention makes it possible to reduce this clearance to a minimum by providing for a very accurate finishing of the pintle surfaces and the aperture bearing surfaces, without interfering with the freedom of assembly.

I claim:

1. A drive chain comprising a plurality of groups of links, the ends of adjacent groups of links being interleaved, said interleaved ends being provided with registering pintle apertures each including a bearing portion defining bearing surfaces of an extent comprising a major portion of a full circumference and a radially extended portion comprising a notch of relatively small circumferential extent, cylindrical pintles accommodated in said bearing portions of the apertures, joining the links of the adjacent groups together and having bearing engagement with said bearing surfaces throughout said extent comprising a major portion of the full circumference of the bearing surface of each pintle aperture, and movement restricting keys accommodated in said notches and adapted to coact with the circumferential extremities thereof so as to limit the flexing of the chain, said keys being separate from said pintles and confined entirely between the cylindrical surfaces of the pintles and the radially outer extremities of said notches.

2. A drive chain as defined in claim 1, wherein said pintles have their cylindrical surfaces ground to an accurate finish and said bearing portions of the apertures are shaved to an accurate, close-tolerance fit with said cylindrical pintle surfaces.

3. A drive chain as defined in claim 1, wherein said bearing portions of the apertures have a circumferential extent in the neighborhood of 315° and said keys have a circumferential extent in the neighborhood of 30°.

4. A drive chain as defined in claim 1, wherein said bearing portions of the apertures have a circumferential extent of greater than $5/6$ of a full circumference and said keys have a circumferential extent of considerably less than $1/6$ of a circumference.

5. A drive chain as defined in claim 1, including washers secured to the ends of said pintles and confining the interleaved ends of the chain links between them, said washers covering the notches at the respective sides of the chain and confining the keys therein.

6. A drive chain as defined in claim 1, wherein said keys and notches have fitted arcuate surfaces and wherein the keys are of substantially less width than said notches.

7. A drive chain as defined in claim 1, wherein the side faces of each key are substantially parallel and the circumferential extremities of said key notches are shaped to conform to said side faces, and wherein said keys are of such small circumferential extent that the forces exerted thereagainst by said circumferential extremities of the notches will be absorbed substantially entirely within the keys and have no substantial radial components of pressure against the pintles.

DAVID B. PERRY.